United States Patent

Køhnke

[11] 3,994,075
[45] Nov. 30, 1976

[54] DUMMY FOR TEACHING ARTIFICIAL INSUFFLATION

[75] Inventor: Ole Bjørn Køhnke, Lyngby, Denmark

[73] Assignee: Ruth Lea Hesse, Rungsted Kyst, Denmark

[22] Filed: Sept. 29, 1975

[21] Appl. No.: 617,709

[30] Foreign Application Priority Data
Oct. 2, 1974 Sweden .............................. 7412421

[52] U.S. Cl. .................................................. 35/17
[51] Int. Cl.² ......................................... G09B 23/28
[58] Field of Search ......................................... 35/17

[56] References Cited
UNITED STATES PATENTS

| | | | |
|---|---|---|---|
| 3,199,225 | 8/1965 | Robertson .............................. | 35/17 |
| 3,209,469 | 10/1965 | James ..................................... | 35/17 |
| 3,562,924 | 2/1971 | Baermann .............................. | 35/17 |
| 3,736,362 | 5/1973 | Laerdal .................................. | 35/17 |

Primary Examiner—Harland S. Skogquist
Attorney, Agent, or Firm—Spencer & Kaye

[57] ABSTRACT

A dummy for teaching mouth-to-mouth and mouth-to-nose resuscitation, has a head shaped to generally correspond to a human head; simulated mouth and nose openings; and a trunk connected to the head by a neck. The trunk has a hollow part simulating the human thorax. The trunk defines an air-tight, self-supporting container which simulates the human torso and lungs. The container has an oblong cross-sectional configuration at least in the zone of the thorax and is connected with the mouth and nose openings by means of a conduit simulating the human windpipe. The trunk wall is resilient at least in the zone of the thorax to undergo outwardly directed elastic deformations by the pressure of insufflated air for effecting changes in the volume of the container in response to insufflation and simulate the movement of the human thorax. The volume of the container is so chosen relative to its resilient properties that the insufflation of the same air volume to be insufflated into the lungs of a human being during correctly performed mouth-to-mouth and mouth-to-nose resuscitation generates the same pressure in the container as in the human lungs. Similarly when insufflation is terminated, the insufflated air, due to the resilient properties of the trunk wall, is forced out of the container which returns to its undeformed shape, thereby simulating the expiration and movement of the human thorax. Thus, the container wall has a resistance to insufflation through either of the openings that is comparable to a corresponding resistance of human lungs and further, the container simulates the movements of a human thorax during mouth-to-mouth and mouth-to-nose resuscitation.

17 Claims, 9 Drawing Figures

DUMMY FOR TEACHING ARTIFICIAL INSUFFLATION

BACKGROUND OF THE INVENTION

The invention relates to a dummy enabling a trainee to acquire experience in the application of artificial insufflation according to the mouth-to-mouth and mouth-to-nose methods as well as externally applied heart massage.

Such dummies comprise parts corresponding to the head of a human being with simulated mouth and nose openings, a neck with simulated windpipe and a trunk, or at least the upper part thereof in the form of a torso with separate simulated lungs. The latter when the dummy is used, i.e. when air is insufflated through the mouth or nose openings, is adapted to offer a resistance to insufflation corresponding to the resistance offered by the lungs of a human being under similar circumstances. In other words, the insufflation of a certain air volume into the teaching dummy should generate the same pressure as the insufflation of the same air volume into the lungs of a person. More sophisticated teaching dummies also comprise separate devices provided in the torso for teaching outside heart massage as well.

In previously known dummies it has been attempted to imitate the resistance to insufflation of human lungs in several different ways, among others by constructing the simulated lungs as a separate receptacle, such as a normally folded plastic bag or the like inserted into the trunk and loaded by a rubber cover counteracting the insufflation of the plastic bag with a force corresponding to the insufflation resistance of the human lungs. Even if such a construction can simulate the insufflation resistance of the lungs in a satisfactory way, it exhibits several essential drawbacks. Thus, for example, it is necessary to provide the dummy with additional separate devices enabling it simultaneously to simulate the conditions in connection with external heart massage. Further the simulation of the lungs proper requires the use of several constructive elements such as plastic bag, rubber covering etc.

SUMMARY OF THE INVENTION

It is an object of the invention to remove the drawbacks characteristic of known teaching dummies and, for this purpose, there is proposed according to the invention an inexpensive sturdy and simple teaching dummy of the type indicated which, in addition to correctly simulating the lung resistance of unconscious persons, also simulates the movements of the human thorax upon insufflation of the lungs and which in addition, makes possible to teach external heart massage without the use of separate accessories for this purpose.

Specifically, the object of the invention is to provide a dummy for teaching resuscitation by means of the mouth-to-mouth and mouth-to-nose methods.

These objects and others to become apparent as the specification progresses, are accomplished by the invention, according to which, briefly stated, the dummy for teaching mouth-to-mouth and mouth-to-nose resuscitation, has a head shaped to generally correspond to a human head; simulated mouth and nose openings; and a trunk connected to the head by a neck. The trunk has a hollow part simulating the human thorax. The trunk wall, at least in the zone of the thorax, defines an air-tight, self-supporting container which simulates the human lungs. The container has an oblong cross-sectional configuration at least in the zone of the thorax and is connected with the mouth and nose openings by means of a conduit simulating the human windpipe. The trunk wall is resilient at least in the zone of the thorax to undergo outwardly directed elastic deformations by the pressure of insufflated air for effecting changes in the volume of the container in response to insufflation. The volume of the container is so chosen relative to its resilient properties that the insufflation of the same air volume to be insufflated into the lungs of a human being during correctly performed mouth-to-mouth and mouth-to-nose resuscitation generates the same pressure in the container as in the human lungs. Thus, the container wall has a resistance to insufflation through either of the openings that is comparable to a corresponding resistance of human lungs and further, the container simulates the movements of a human thorax during mouth-to-mouth and mouth-to-nose resuscitation.

Summarizing the basic idea of the invention it may be said that the use of a simulated trunk which not only (as is the case according to the state of the art) supports but actually forms the simulated lung of the dummy and which for this purpose is constructed as an airtight, self-supporting container, the volume content and outer form of which are chosen in accordance with the normal anatomy and the pneumatic lung elasticity of the group of patients in question, permits simultaneous simulation of the topographic anatomy of the human body, the pneumatic elasticity of the human lungs and the rising and lowering of the thorax in accordance with filling and emptying of the lungs.

For a life-like simulation of the rising and lowering of the thorax of an unconscious patient who is treated according to the above-mentioned methods, the air-filled cavity of the trunk container in uneffected condition must be only of such size that, by the compressibility of the enclosed air volume in cooperation with the elastic reaction of the container wall during an increase of volume of the trunk container, there is achieved, upon insufflation of an air volume normal under "live" circumstances, a life-like simulation of the pneumatic lung elasticity of a patient and, at the same time, a life-like rise of the thorax-simulating part of the container wall during the increase of volume of the trunk container. The invention thus provides a single, simple structural component for simulating all the above-described functions.

In order to simulate the thorax movement and lung elasticity of an unconscious adult person having a weight of about 70 kg the volume content of the trunk container, in accordance with the above requirements, should not be greater than about 25 – 30 l and for a child not greater than about 2 – 10 l depending on the age of the child.

More generally, it may even be said that in a container provided in accordance with the invention the volume is so chosen that the pneumatic compliance of the enclosed air volume does not exceed about 60% of the average or typical lung compliance of the group of patients in question. The term "compliance" is generally used in this context as a designation of the ratio between the amount of air ($\Delta V$) supplied in a cavity and expressed in liters and the corresponding pressure increase ($\Delta P$) expressed in cm $H_2O$.

The structural details of the connection between the mouth-nose openings and the lung simulating trunk container are not critical regarding the invention and may be designed in several different conventional ways. The only requirement with which this connection has to comply are that the insufflated air should reach the trunk container while the head is correctly tiltted backward, a position corresponding to a free air-flow path. This result is obtainable in a known way (compare, for example, Swedish Pat. No. 227,733 entitled "Dummy for Teaching Resuscitation of Unconscious Persons by Insufflation of Air in their Lungs"). For example, the mouth-nose openings may directly communicate via a conduit simulating the windpipe with the trunk container. In respect to the risk of communicating infections when a plurality of persons practice with the dummy it is expedient to use, in a known way (compare, for example, Swedish Pat. application No. 12211/70), two separate systems. The trainee insufflates air into a primary system, for example an initially folded bag of plastic material. The insufflation of the primary system is performed without any resistance from the bag itself. By the insufflation of the bag a corresponding amount of air is diisplaced into a secondary system in communication with the trunk container according to the invention which offers the simulated lung resistance.

One of the basic ideas of the invention thus resides in using a trunk-like, air-tight container which in uncharged condition has a shape corresponding to a certain volume whereas upon insufflation of air it assumes a different shape corresponding to a larger volume. This change of volume is obtained due to the fact that at least that part of the container which corresponds to the human thorax has a cross-sectionally oblong shape section and further, due to the fact that the container walls have resilient outward deformability. When air is insufflated, the pressure in the entire trunk-like container is increased due to the compression of the air contained therein which means that the container tends to assume a shape corresponding to a larger volume. As the container walls are made of such a material and have a thickness that a change of shape is possible at the pressure values in view, the oblong cross-sectional shape will be elastically deformed towards a more circular cross-sectional shape which means that the volume of the container increases as the pressure increases. This increase of pressure is determined by the resilient resistance of the container against the change of volume and by the compressibility of the enclosed air. The pressure increase in the container under these conditions is less than when the same amount of air is insufflated into an equally large but completely stiff container.

The specific cross-sectional shape of the portion of the container intended to be resiliently deformed when the pressure is increasing can of course be varied within wide limits. For example, the cross-sectional shape may be substantially rectangular or ellipsoidal or of a shape intermediary to these shapes. Since the container should have the greatest possible similarity to a human torso, the ratio between width and height of the oblong cross-sectional shape is expediently between about 1.5 and 2.0. The desired result may, however, also be obtained at different width/height ratios, for example down to 1.25 and up to 2.5. Obviously, there is further no reason why the container should not exhibit local deviations from the basic shape, for example in order to improve the anatomical correctness of the container. Also the volume and shape of the rest of the container are chosen in such a way that the dummy will exhibit anatomically correct proportions to the greatest possible extent.

The choice of the material and the wall thickness of the container may also be varied within wide limits with the aid of the structural and functional statements made here, the proper combinations of material and wall thickness can be easily made. Preferably, as a wall material a semi-hard plastic material, such as polyethylene or PVC permitting simple manufacturing methods, such as rotational molding.

In order to make possible the use of the teaching dummy with reproducible results during an extended period of time, the change of shape mentioned above should be substantially resilient. This may be obtained by a suitable combination of wall material and wall thickness in respect to the specifically chosen shape of the container.

Even if it is possible per se to give the complete trunk container resilient outward deformability, these properties should preferably be concentrated to the portion of the container corresponding to the thorax whereas the remaining portions of the container should be substantially immobile during the pressure increase prevailing in the total container during insufflation. This may be achieved, for example, by shaping these portions substantially circularly and/or manufacturing them with greater wall thickness and/or from stiffer material.

The properties of the trunk container simulating the human lung and associated anatomy, can be combined without difficulty with properties simulating the conditions encountered during external heart massage. This requires that the container walls upon depression at the correct pressure point for external heart massage offer the same resistance to the depression as does the human body. It is a further requirement that the depression be resilient with a substantially linear ratio between force and depression depth.

The correct pressure point for outside heart massage is positioned on that portion of the trunk-like container which simulates the human thorax and which has an oblong cross-sectional shape. When the trunk container is shaped in such a way that the container wall is substantially plane in the range around the correct pressure point (for example in containers having substantially rectangular cross-sectional shape) no specific modification is required in the container or container wall in order to use the dummy also for teaching heart massage because the depression of the plane container wall yields the desired resilient downward deflection with a linear ratio between depressing force and depressing depth.

When the container wall in the range of the correct depressing point has a convex shape (for example, in a container having an elliposidal cross-sectional shape) it is expedient to provide the convex container wall with an inward depression or deformation or the like extending through the pressure point. The purpose of such configuration is to balance the tension which otherwise would appear during compression due to the convex shape of the container wall to cause a non-linear ratio between depressing force and depressing depth. The more convex the container wall in the range of the depressing point, the more pronounced the downward deformation or the like must be (deeper and/or longer).

DESCRIPTION OF THE PREFERRED EMBODIMENTS

Figure 1A:
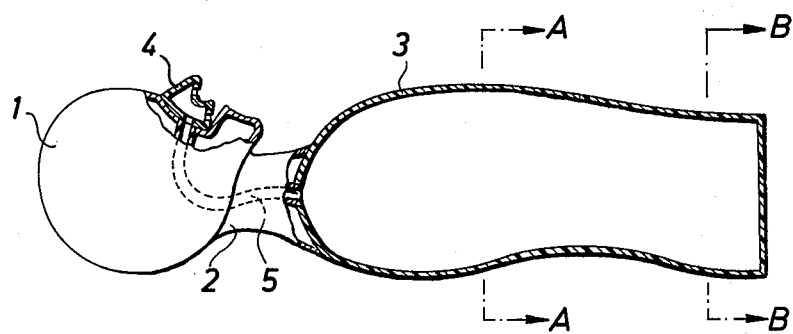
FIGS. 1a, 1b and 1c are schematic sectional side elevational views of a teaching dummy according to the invention, in the rest position, in the insufflated position and in the depressed position during heart massage, respectively

The teaching dummy illustrated in FIGS. 1 to 4 comprises a head 1, a neck portion 2 and an air-tight, trunk-like container 3 simulating the topographic anatomy of a human trunk and which according to the invention at the same time serves as a lung-simulating constructive element. Head 1 is provided with a preferably detachable mouth-nose portion 4, the simulated mouth-nose openings of which are in communication with the trunk-like container 3 via a conduit 5 simulating the windpipe. In a way known per se, conduit 5 is provided with devices (not shown) controlling the connection between the mouth-nose openings and the trunk-like container 3 in such a way as to open the communication only when the head is tilted backward as in FIG. 1b. Although if the communication between the mouth-nose openings and the trunk-like container 3 is shown as a direct connection for reason of clarity, it is preferred to use, in a way known per se, two separate systems in order to avoid communication of infections due to the fact that several persons use the dummy. Such a double system is described, for example, in Swedish patent application 12211/70.

The trunk-like container 3 forming the most important feature of the invention, is manufactured in, the embodiment shown, from polyethylene having a wall thickness of about 2 mm. The container volume is limited to about 25 l. It is possible to extend the container shape such as to simulate the topographic anatomy of a torso cut off at the waist and the shoulders. The portiion of the container corresponding to the human thorax has oblong cross-sectional shape which is substantially rectangular in unloaded (unstressed) condition as appears from the full-line representation in FIG. 3. The ratio between width b and height a in the oblong container portion is about 2:1. The portion of the container below the thorax portion has a substantially circular cross-sectional shape as shown in FIG. 4.

It has previously been stated that the volume of the trunk container is so chosen that the pneumatic compliance of the enclosed air volume does not exceed about 60% of the average or typical lung-compliance of the patient group in question.

In the description that follows, there is given an example of how the dimensioning of the trunk container is performed in practice when conditions in an adult person weighing about 70 kg are to be simulated.

The normal lung-compliance amounts in this case to about 0.045 l/cm $H_2O$ when the person is unconscious and lying on the back which means that upon insufflation of, for example, 1 l air into the lungs of the patient a pressure increase of $(1/0.045) = 22{,}22$ cm $H_2O$ is obtained.

The pneumatic compliance of the air volume enclosed in the trunk container thus should not exceed $$(0.045/100) \cdot 60 \text{ [l/cm } H_2O] = 0.027 \text{ l/cm } H_2O.$$

From the physical laws concerning compression and expansion of a confined air volume it may be derived that the air in a container having stiff walls and a volume of $0.027 \times 10^3$ l $= 27$ l has, with a fair approximation, a constant pneumatic compliance equal to 0.027 l/cm $H_2O$ in the working range with which the invention is concerned.

Thus, if the trunk container has completely stiff walls, the realistic lung venting pressure of 22.22 cm $H_2O$ would be achieved after insufflation of only 0.027 l/cm $H_2O$ $= 22.22$ cm $H_2O$ $= 0.60$ l air. This means a difference, in relation to the realistic insufflation volume, of $1.0$ l $- 0.60$ l $= 0.40$ l.

The resilient properties of the container wall are thus so chosen that at a pressure of 22.22 cm $H_2O$ a resilient outward deformation of the container walls is obtained corresponding to an increase of the volume of the container by 0.40 l in comparison with the rest condition. This adaptation of the resilient outward deformation of the container wall is performed in the following way:

By limiting the size of the trunk container to such an extent that its outer shape only simulates the upper trunk portion of the patient without arms, it is possible to design the container with dimensions which are realistic for an adult person weighting about 70 kg while at the same time the air volume within the container may be held below the established value of 27 l. As for the rest, the shape is chosen so that volume changes incident to increasing pressure preferably appear in the range simulating the human thorax, for example in such a way that the cross section of the container is given a large oval shape in this range and a correspondingly smaller oval or circular shape at the free end of the trunk container.

The adaptation of the properties of elastic outward deformation of the container wall is then performed in such a way that after having chosen a suitable starting material for the manufacturing process, the thickness of the container wall is so adjusted that incident to insufflation of 1 l air, a pressure increase of about 22 cm $H_2O$ is obtained.

Such a container is advantageously manufactured by blowing or rotational casting methods.

The teaching dummy illustrated in the drawings operates as follows:

When artificial insufflation is performed, the trainee insufflates air through the mouth-nose openings in the head 1, whereby a corresponding amount of air penetrates into the trunklike container 3. Due to the increase of pressure caused thereby in container 3, the oval thorax portion of the container will change its shape by resilient outward deformation of the container wall. The thorax portion will then be raised from the position in FIG. 1a to position 3a in FIG. 1b and the cross-sectional shape will change from the shape indicated by the full line 3 in FIG. 3 to the shape illustrated by the broken line 3a in FIG. 3. This volume increase of the trunk-like container 3 actually causes the portion of the container wall simulating the human thorax to rise about 1 cm which is normal in an unconscious adult person.

On the other hand, the shape or volume of the lower portion of the container having circular cross-sectional shape is not changed. After completing of an insufflation the, amount of air insufflated is pressed out of the trunk-like container due to the fact that the container wall resiliently reverts to its starting position while the enclosed air volume expands to atmospheric pressure.

Figure 1B:
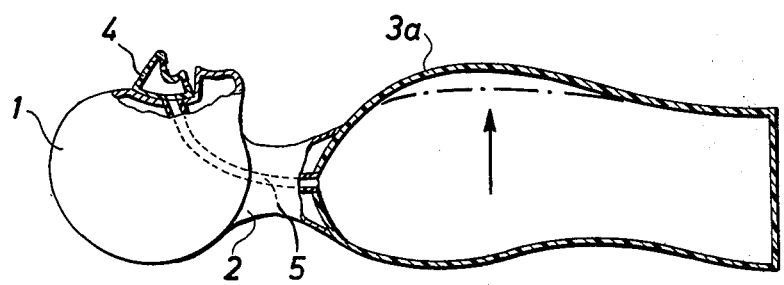
Figure 1C:
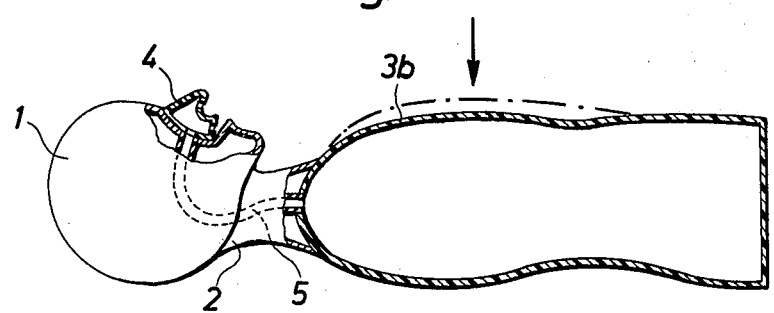
Figure 2:
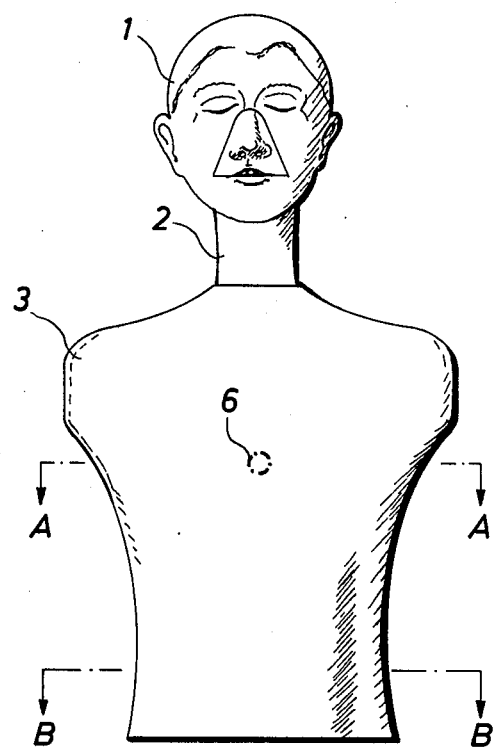
FIG. 2 shows the dummy according to FIGS. 1a, 1b and 1c in plan view.
Figure 3:
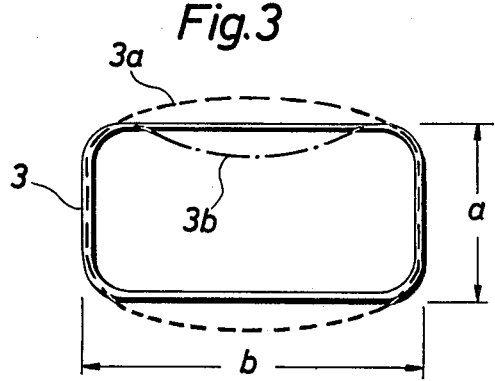
FIGS. 3 and 4 are sections along lines A—A and B—B, respectively, in FIGS. 1 and 2.
Figure 4:
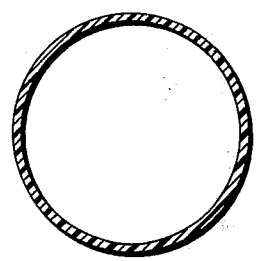

As the upper wall of the trunk-like container 3 in the embodiment described by reference to FIGS. 1 to 3 is substantially plane in the range of the correct pressure point 6 for eexternal heart massage, no particular modifications of the container wall are required and the dummy may be used for the purpose of teaching heart massage. During such instruction the trainee depresses the container wall at the correct pressure point 6, causing the container wall, while maintaining a linear ratio between depressing force and depressing depth, to assume the position 3b illustrated in solid lines in FIG. 1c and in dot lines in FIG. 3 (in FIGS. 1b and 1c the dash-dot lines show the position of the container wall in uncahrged condition). At the end of the depressing action the container wall reverts to the starting position by resilient action.

Figure 5:
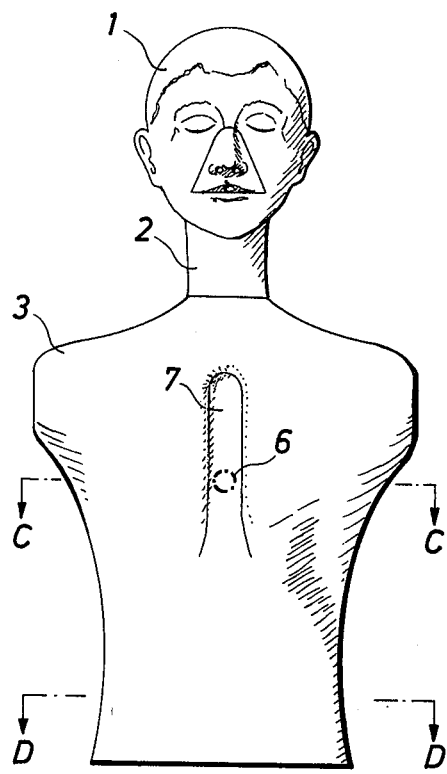
FIGS. 5 to 7 correspond to FIGS. 2 to 4 but show an alternative embodiment of the teaching dummy according to the invention.
Figure 6:
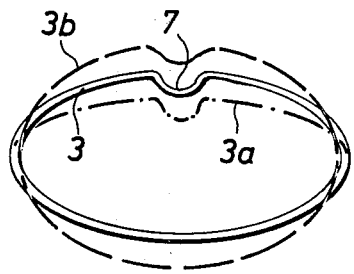
Figure 7:
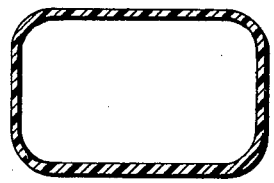

In the alternative embodiment shown in FIGS. 5 to 7 the trunk-like container has a substantially ellipsoidal cross-sectional shape in the thorax range. In order to eliminate the tensions which might appear due to the convexity of the upper wall when heart massage is applied and to thus avoid an undesirable non-linear ratio between depressing force and depressing depth, the container wall is provided with a longitudinal downward deformation 7 extending through the correct pressure point 6 for the heart massage. Moreover, this embodiment is distinguished from that according to FIGS. 1 to 4 by the fact that the portion below the thorax has a substantially rectangular cross-sectional shape as illustrated in FIG. 7. However as this portion has a greater wall thickness than the ellipsoidal thorax portion, no appreciable change of shape and volume will appear during insufflation of air into container 3. The same result is obtainable by manufacturing the walls of the lower container portion from stiffer material than the thorax portion. As for the rest, the embodiment according to FIGS. 5 to 7 is fully analogous to the embodiment according to FIGS. 1 to 4. Thus FIG. 5 corresponds to FIG. 2 and FIGS. 6 and 7 are sections along lines C—C and D—D of FIG. 5, respectively.

It will be understood that the above description of the present invention is susceptible to various modifications, changes and adaptations, and the same are intended to be comprehended within the meaning and range of equivalents of the appended claims.

What I claim is:

1. In a dummy for teaching mouth-to-mouth and mouth-to-nose resuscitation, including a head shaped to generally correspond to a human head; means defining simulated mouth and nose openings; a neck; a trunk connected to the head by the neck and having a wall defining a hollow trunk part which is in the shape of a human torso including the thorax; receptacle means defining, in the thorax, an enclosed space simulating the human lung; a conduit simulating a human windpipe and being connected to the mouth and nose openings and the receptacle means; the receptacle means having a resistance to insufflation through either of the openings that is comparable to a corresponding resistance of human lungs; the receptacle means being deformable for simulating the movements of a human thorax during mouth-to-mouth and nose-to-mouth resuscitation; the improvement wherein said receptacle means is an air-tight, self-supporting container constituted by the wall of said trunk; said container having an oblong cross-sectional configuration at least in the zone of the thorax; the trunk wall being resilient at least in the zone of the thorax to undergo outwardly directed elastic deformation by the pressure of insufflated air for effecting changes in the volume of the container in response to insufflation; the volume of the container being so chosen in relation to its resilient properties that the insufflation of the same air volume to be insufflated into the lungs of a human being during correctly performed mouth-to-mouth and mouth-to-nose resuscitation generates the same pressure in said container as in the human lungs.

2. A dummy as defined in claim 1, wherein the portion of the container corresponding to the thorax has a substantially ellipsoidal cross-sectional shape.

3. A dummy as defined in claim 1, wherein the portion of the container corresponding to the thorax has a substantially rectangular cross-sectional shape.

4. A dummy as defined in claim 1, wherein the portion of the container corresponding to the thorax has a cross-sectional shape intermediary between ellipsoidal and rectangular.

5. A dummy as defined in claim 1, wherein the cross-sectional shape of the portion of the container corresponding to the thorax has anatomically motivated local deviations from a generally oblong cross-sectional shape.

6. A dummy as defined in claim 1, wherein the container has such a volume that the pneumatic compliance of the air volume enclosed by the container is at the most about 60% of the average lung compliance of a given group of patients represented by the dummy.

7. A dummy as defined in claim 6, wherein for simulating the thorax movement and lung elasticity of an unconscious adult person weighing about 70 kg, the volume content of the container is at the most about 25 – 30 l.

8. A dummy as defined in claim 6, wherein for simulating the thorax movement and lung elasticity of an unconscious child, the volume content of the container is at the most about 2 – 10 l depending on the age of the child.

9. A dummy as defined in claim 1, wherein the portion of the container corresponding to the thorax has a width-to-height ratio between 1.25 and 2.5.

10. A dummy as defined in claim 9, wherein said ratio is between 1.5 and 2.0.

11. A dummy as defined in claim 1, wherein portions of the container situated further down from the portion corresponding to the thorax are substantially resistant to deformation by internal pressure generated by insufflation.

12. A dummy as defined in claim 11, wherein the deformation-resistant container portion has a substantially circular cross-sectional shape.

13. A dummy as defined in claim 11, wherein the deformation-resistant container portion has a greater wall thickness than the thorax portion.

14. A dummy as defined in claim 11, wherein the deformation-resistant container portion has a stiffer material than the thorax portion.

15. A dummy as defined in claim 1, wherein the resistance of the container to depression at the anatomically correct pressure point for external heart massage corresponds to the resistance to depression offered by a human body when external heart massage is correctly performed.

16. A dummy as defined in claim 15, wherein the container wall is substantially plane in the zone of the correct pressure point for heart massage.

17. A dummy as defined in claim 15, wherein the container wall is substantially convex in the zone of the correct pressure point for heart massage, the container wall further has an inward deformation extending longitudinally of the thorax through the correct pressure point for heart massage for balancing stresses that appear upon depression of the container wall.

* * * * *